(12) United States Patent
Tanaka

(10) Patent No.: US 12,087,515 B2
(45) Date of Patent: Sep. 10, 2024

(54) ELECTROLYTIC CAPACITOR AND METHOD FOR MANUFACTURING ELECTROLYTIC CAPACITOR

(71) Applicant: Murata Manufacturing Co., Ltd., Nagaokakyo (JP)

(72) Inventor: Yasuo Tanaka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 92 days.

(21) Appl. No.: 17/955,635

(22) Filed: Sep. 29, 2022

(65) Prior Publication Data

US 2023/0038003 A1 Feb. 9, 2023

Related U.S. Application Data

(63) Continuation of application No. PCT/JP2021/012580, filed on Mar. 25, 2021.

(30) Foreign Application Priority Data

Apr. 10, 2020 (JP) .................................. 2020-071310

(51) Int. Cl.
*H01G 9/048* (2006.01)
*H01G 9/012* (2006.01)
(Continued)

(52) U.S. Cl.
CPC .............. *H01G 9/048* (2013.01); *H01G 9/012* (2013.01); *H01G 9/08* (2013.01); *H01G 9/15* (2013.01)

(58) Field of Classification Search
USPC ......................................................... 361/540
See application file for complete search history.

(56) References Cited

U.S. PATENT DOCUMENTS

| | | | |
|---|---|---|---|
| 6,563,693 B2* | 5/2003 | Nakada | H01G 9/15 361/531 |
| 2009/0185331 A1* | 7/2009 | Kurokawa | H01G 9/012 361/533 |

(Continued)

FOREIGN PATENT DOCUMENTS

| | | | | |
|---|---|---|---|---|
| JP | 06252010 A | * | 9/1994 | ............. H01G 11/56 |
| JP | H09270360 A | | 10/1997 | |

(Continued)

OTHER PUBLICATIONS

International Search Report in PCT/JP2021/012580, mailed Jun. 29, 2021, 3 pages.

(Continued)

*Primary Examiner* — Eric W Thomas
(74) *Attorney, Agent, or Firm* — ArentFox Schiff LLP

(57) ABSTRACT

An electrolytic capacitor that includes a resin molding that includes a capacitor element including an anode, a dielectric layer, and a cathode, a sealing resin sealing the capacitor element; a first external electrode on a first end surface of the resin molding; and a second external electrode on a second end surface and connected to the cathode exposed at the second end surface of the resin molding, wherein when viewed in a thickness direction perpendicular to the length direction, the anode includes a first anode region having a first outer edge exposed at the first end surface and connected to the first external electrode, and a second anode region having a second outer edge positioned closest to the second external electrode in the length direction, and a length of the first outer edge is greater than a length of the second outer edge in a width direction.

19 Claims, 11 Drawing Sheets

(51) Int. Cl.
*H01G 9/08* (2006.01)
*H01G 9/15* (2006.01)

(56) References Cited

U.S. PATENT DOCUMENTS

| | | |
|---|---|---|
| 2016/0071654 A1 | 3/2016 | Kimura et al. |
| 2017/0140877 A1 | 5/2017 | Kuromi |
| 2020/0273628 A1 | 8/2020 | Suzuki et al. |

FOREIGN PATENT DOCUMENTS

| | | | |
|---|---|---|---|
| JP | 2005005310 A | * | 1/2005 |
| JP | 2006128283 A | | 5/2006 |
| JP | 2009295605 A | | 12/2009 |
| JP | 2017098297 A | | 6/2017 |
| JP | 2018082008 A | | 5/2018 |
| WO | 2014188833 A1 | | 11/2014 |
| WO | 2019087692 A1 | | 5/2019 |

OTHER PUBLICATIONS

International Search Report in PCT/JP2021/012584, mailed Jun. 29, 2021, 3 pages.

* cited by examiner

ELECTROLYTIC CAPACITOR AND METHOD FOR MANUFACTURING ELECTROLYTIC CAPACITOR

CROSS REFERENCE TO RELATED APPLICATIONS

The present application is a continuation of International application No. PCT/JP2021/012580, filed Mar. 25, 2021, which claims priority to Japanese Patent Application No. 2020-071310, filed Apr. 10, 2020, the entire contents of each of which are incorporated herein by reference.

FIELD OF THE INVENTION

The present invention relates to an electrolytic capacitor and a method of producing an electrolytic capacitor.

BACKGROUND OF THE INVENTION

An electrolytic capacitor such as a solid electrolytic capacitor is produced by, for example, forming a dielectric layer on a surface of an anode made of a valve-action metal and subsequently forming a cathode opposite to the anode via the dielectric layer.

For example, Patent Literature 1 discloses a solid electrolytic capacitor including: a capacitor element including an aluminum (Al)-containing anode including a core and a porous portion, a dielectric layer containing an Al oxide on a predetermined surface of the porous portion, and a cathode including a solid electrolyte layer on a surface of the dielectric layer; an exterior sealing the capacitor element in such a manner that an end of the anode is exposed; a first external electrode on a surface of the exterior and electrically connected to the cathode; and a second external electrode on the surface of the exterior and connected to an end of the anode, wherein the porous portion in a region without the cathode has a portion thinner than the porous portion in a region with the cathode.

Patent Literature 1: JP 2017-98297 A

SUMMARY OF THE INVENTION

An electrolytic capacitor such as a solid electrolytic capacitor usually includes an anode with a porous portion on its surface. Due to low adhesion between the porous portion and an external electrode, for example, the external electrode is easily removed by thermal stress, and moisture easily penetrates from outside to the region where the external electrode is removed, likely resulting in low reliability.

In the case of the solid electrolytic capacitor disclosed in Patent Literature 1, the porous portion is made thinner at the end of the anode connected to the second external electrode as shown in FIG. 1, FIG. 2, and elsewhere of Patent Literature 1. Yet, the thinner the porous portion is as described above, the smaller the contact area between the anode and the second external electrode becomes, making it impossible to sufficiently improve the reliability.

The present invention attempts to solve the above issue and aims to provide a highly reliable electrolytic capacitor with high adhesion between an anode and an external electrode. The present invention also provides a method of producing the electrolytic capacitor.

An electrolytic capacitor of the present invention includes: a resin molding that includes a capacitor element including an anode having a porous portion at a surface thereof, a dielectric layer on a surface of the porous portion, and a cathode opposite to the anode via the dielectric layer, a sealing resin sealing the capacitor element, and a first end surface and a second end surface opposite to each other in a length direction of the resin molding; a first external electrode on the first end surface of the resin molding; and a second external electrode on the second end surface and connected to the cathode exposed at the second end surface of the resin molding, wherein when viewed in a thickness direction perpendicular to the length direction of the resin molding, the anode includes a first anode region having a first outer edge exposed at the first end surface of the resin molding and connected to the first external electrode, and a second anode region having a second outer edge positioned closest to the second external electrode in the length direction, and a length of the first outer edge is greater than a length of the second outer edge in a width direction perpendicular to the length direction and the thickness direction of the resin molding.

A method of producing an electrolytic capacitor of the present invention includes: forming an anode component including an anode having a porous portion at a surface thereof, and having a shape including a trunk portion extending in a width direction and an elongated portion protruding from the trunk portion in a length direction perpendicular to the width direction thereof; forming a capacitor element component by sequentially forming a dielectric layer on a surface of the porous portion and forming a cathode on a surface of the porous portion of the anode component; forming a capacitor element by cutting the capacitor element component along a cutting line in the width direction so that each of the resulting capacitor elements when viewed in a thickness direction perpendicular to the width direction and the length direction includes the anode, the dielectric layer, and the cathode, the anode including a first anode region including a first outer edge corresponding to the cutting line and a second anode region including a second outer edge positioned furthest away from the first anode region in the length direction within an outer edge of the elongated portion, and in which a length of the first outer edge of the anode is greater than a length of the second outer edge of the anode in the width direction; sealing the capacitor element component with a sealing resin so as to form a resin molding having a first end surface and a second end surface opposite to each other in the length direction, the first end surface having the first outer edge of the anode exposed therefrom, the second end surface having the cathode exposed therefrom; forming a first external electrode on the first end surface of the resin molding and connected to the first outer edge of the anode exposed at the first end surface of the resin molding; and forming a second external electrode on the second end surface of the resin molding and connected to the cathode exposed at the second end surface of the resin molding.

The present invention can provide a highly reliable electrolytic capacitor with high adhesion between an anode and an external electrode. The present invention can also provide a method of producing the electrolytic capacitor.

DETAILED DESCRIPTION OF THE PREFERRED EMBODIMENTS

Figure 1:
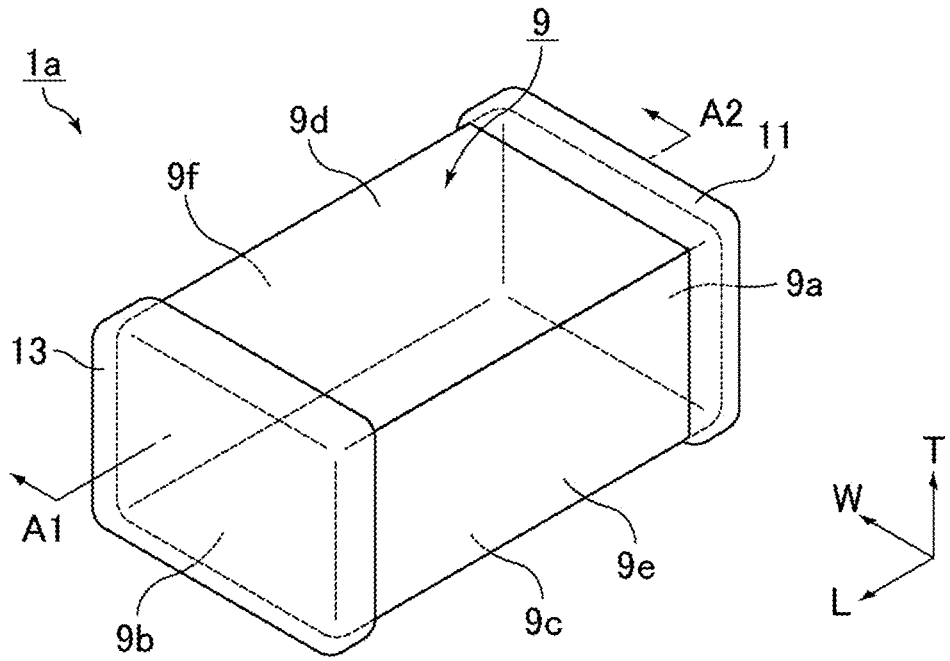
FIG. 1 is a schematic perspective view showing an electrolytic capacitor of Embodiment 1 of the present invention.

The electrolytic capacitor of the present invention and the method of producing an electrolytic capacitor of the present invention are described below. The present invention is not limited to the following preferred embodiments and may be suitably modified without departing from the gist of the present invention. Combinations of preferred features described in the following preferred embodiments are also within the scope of the present invention.

The following embodiments are examples, and features of different embodiments can be partially exchanged or combined with each other. In the second embodiment and subsequent embodiments, a description of features common to the first embodiment is omitted, and only different points are described. In particular, similar effects by similar features are not mentioned in each embodiment. In the following description, the electrolytic capacitor of each embodiment is simply referred to as "the electrolytic capacitor of the present invention" when no distinction is made between the embodiments.

Embodiment 1

The electrolytic capacitor of the present invention includes: a resin molding that includes a capacitor element including an anode having a porous portion at a surface thereof, a dielectric layer on a surface of the porous portion, and a cathode opposite to the anode via the dielectric layer, a sealing resin sealing the capacitor element, and a first end surface and a second end surface opposite to each other in a length direction of the resin molding; a first external electrode on the first end surface of the resin molding; and a second external electrode on the second end surface and connected to the cathode exposed at the second end surface of the resin molding, wherein when viewed in a thickness direction perpendicular to the length direction of the resin molding, the anode includes a first anode region having a first outer edge exposed at the first end surface of the resin molding and connected to the first external electrode, and a second anode region having a second outer edge positioned closest to the second external electrode in the length direction, and a length of the first outer edge is greater than a length of the second outer edge in a width direction perpendicular to the length direction and the thickness direction of the resin molding.

In the electrolytic capacitor of the present invention, the first anode region may be in contact with the second anode region in the length direction. In the electrolytic capacitor of the present invention, the length in the width direction of the first anode region and the length in the width direction of the second anode region may be respectively constant in the length direction. In the electrolytic capacitor of the present invention, the resin molding may further include a side surface intersecting the first end surface, the first external electrode may extend from the first end surface of the resin molding to a portion of the side surface, and the anode may be connected to the first external electrode at the side surface of the resin molding in the first anode region. Such a case is described below as an electrolytic capacitor of Embodiment 1 of the present invention.

FIG. 1 is a schematic perspective view showing an electrolytic capacitor of Embodiment 1 of the present invention. As shown in FIG. 1, an electrolytic capacitor 1a includes a resin molding 9, a first external electrode 11, and a second external electrode 13.

Herein, a length direction, a width direction, and a thickness direction are directions indicated by an arrow L, an arrow W, and an arrow T, respectively, as shown in FIG. 1 and elsewhere. Here, the length direction L, the width direction W, and the thickness direction T are perpendicular to one another.

Herein, in the electrolytic capacitor, a plane along the length direction L and the thickness direction T is referred to as an "LT plane", a plane along the length direction L and the width direction W is referred to as an "LW plane", and a plane along the width direction W and the thickness direction T is referred to as a "WT plane".

The resin molding 9 is substantially cuboidal, and includes a first end surface 9a and a second end surface 9b (WT planes) opposite to each other in the length direction L; a bottom surface 9c and a top surface 9d (LW planes) opposite to each other in the thickness direction T, and a first side surface 9e and a second side surface 9f (LT planes) opposite to each other in the width direction W.

The first end surface 9a and the second end surface 9b of the resin molding 9 may not be exactly perpendicular to the length direction L. The bottom surface 9c and the top surface 9d of the resin molding 9 may not be exactly perpendicular to the thickness direction T. The first side surface 9e and the second side surface 9f of the resin molding 9 may not be exactly perpendicular to the width direction W.

The first external electrode 11 is on the first end surface 9a of the resin molding 9. Preferably, the first external electrode 11 extends from the first end surface 9a of the resin molding 9 to one or both of the first side surface 9e and the second side surface 9f. Preferably, the first external electrode 11 extends from the first end surface 9a of the resin molding 9 to one or both of the bottom surface 9c and the top surface 9d.

The second external electrode 13 is on the second end surface 9b of the resin molding 9. Preferably, the second external electrode 13 extends from the second end surface 9b of the resin molding 9 to one or both of the first side surface 9e and the second side surface 9f. Preferably, the second external electrode 13 extends from the second end surface 9b of the resin molding 9 to one or both of the bottom surface 9c and the top surface 9d.

Figure 2:
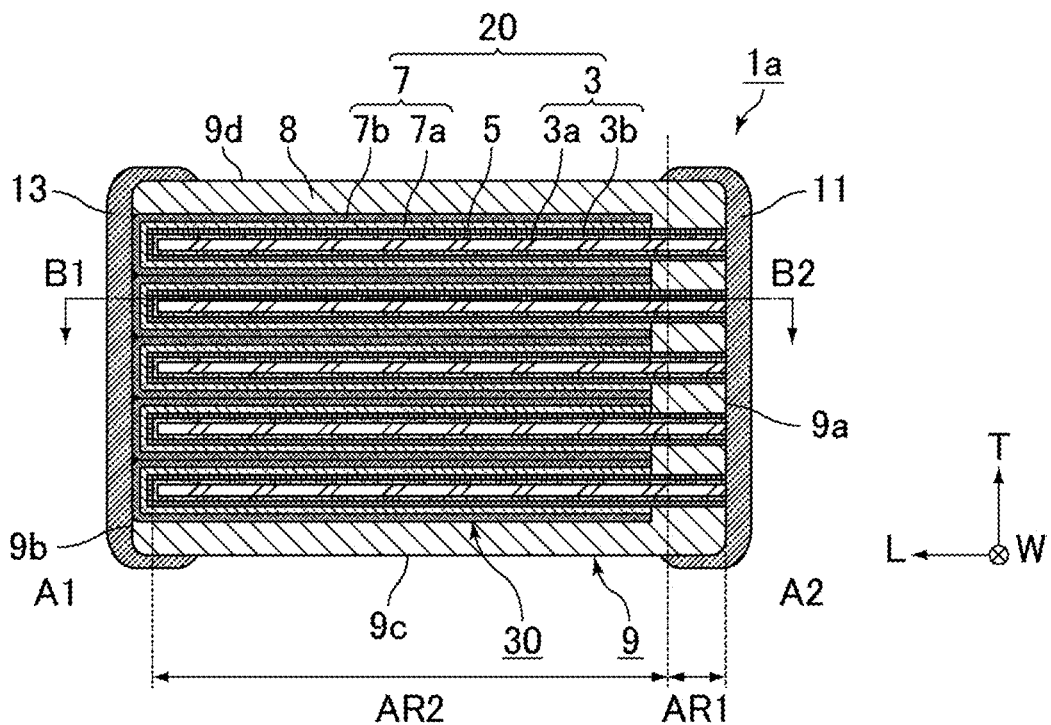
FIG. 2 is a schematic cross-sectional view taken along a line A1-A2 in FIG. 1.

FIG. 2 is a schematic cross-sectional view taken along a line A1-A2 in FIG. 1. As shown in FIG. 2, the resin molding 9 includes multiple capacitor elements 20 and a sealing resin 8 sealing the multiple capacitor elements 20. More specifically, the resin molding 9 includes a stack 30 of the multiple capacitor elements 20 stacked in the thickness direction T and the sealing resin 8 sealing the stack 30. In the stack 30, the capacitor elements 20 may be bonded to each other via a conductive adhesive.

Preferably, the resin molding 9 includes multiple capacitor elements 20 but may include one capacitor element 20.

The capacitor element 20 includes an anode 3, a dielectric layer 5, and a cathode 7.

The anode 3 includes a valve-action metal substrate 3a at a center thereof and a porous portion 3b at a surface thereof.

Examples of valve-action metal of the valve-action metal substrate 3a include elemental metals such as aluminum, tantalum, niobium, titanium, zirconium, magnesium, and silicon, and alloys containing at least one of these metals. In particular, aluminum and an aluminum alloy are preferred.

The valve-action metal substrate 3a is preferably a flat plate, more preferably foil.

Preferably, the porous portion 3b is an etched layer of the valve-action metal substrate 3a etched with hydrochloric acid or the like.

The thickness of the valve-action metal substrate 3a before etching is preferably 60 μm to 180 μm. After etching, the thickness of the non-etched core of the valve-action metal substrate 3a is preferably 10 μm to 70 μm. The thickness of the porous portion 3b is designed according to the withstand voltage and capacitance required for the electrolytic capacitor 1a. In the cross section shown in FIG. 2, the total thickness of the porous portions 3b on both sides of the valve-action metal substrate 3a is preferably 10 μm to 120 μm. The porous portion 3b may be on one of main surfaces of the valve-action metal substrate 3a.

The anode 3 is exposed at the first end surface 9a of the resin molding 9 and connected to the first external electrode 11.

The form of the anode, which is a characteristic feature of the electrolytic capacitor of the present invention, is described later.

The dielectric layer 5 is on a surface of the porous portion 3b.

Preferably, the dielectric layer 5 is made of an oxide film of the valve-action metal. For example, when the valve-action metal substrate 3a is aluminum foil, the valve-action metal substrate 3a is anodized in an aqueous solution containing boric acid, phosphoric acid, adipic acid, a sodium salt or an ammonium salt thereof, or the like, whereby an oxide film that serves as the dielectric layer 5 is formed. The dielectric layer 5 is formed along the surface of the porous portion 3b, whereby pores (recesses) are formed in the dielectric layer 5.

The thickness of the dielectric layer 5 is designed according to the withstand voltage, capacitance, and the like required for the electrolytic capacitor 1a. The thickness is preferably 10 nm to 100 nm.

The cathode 7 is opposite to the anode 3 via the dielectric layer 5.

The cathode 7 includes a solid electrolyte layer 7a on a surface of the dielectric layer 5. Preferably, the cathode 7 includes a conductive layer 7b on a surface of the solid electrolyte layer 7a. The electrolytic capacitor 1a includes the solid electrolyte layer 7a as a part of the cathode 7 and is thus regarded as a solid electrolytic capacitor.

The electrolytic capacitor of the present invention may be an electrolytic capacitor including an electrolytic solution instead of a solid electrolyte; or may be an electrolytic capacitor including a solid electrolyte and an electrolytic solution.

Examples of constituent materials of the solid electrolyte layer 7a include a conductive polymer having a pyrrole, thiophene, or aniline skeleton. A conductive polymer having a thiophene skeleton is, for example, poly(3,4-ethylenedioxythiophene) (PEDOT), and may be PEDOT:PSS which is a complex with a dopant (poly(styrene sulfonate) (PSS)).

The solid electrolyte layer 7a is formed by, for example, a method in which a polymerized film of poly(3,4-ethylenedioxythiophene) or the like is formed on a surface of the dielectric layer 5 using a treatment liquid containing a monomer such as 3,4-ethylenedioxythiophene, or a method in which a dispersion of a polymer such as poly(3,4-ethylenedioxythiophene) is applied to the surface of the dielectric layer 5 and then dried. The solid electrolyte layer 7a is formed in a predetermined region by applying the treatment liquid or dispersion to the surface of the dielectric layer 5 by a method such as immersion coating, screen printing, transfer printing, inkjet printing, dispensing, or spray coating. Preferably, the solid electrolyte layer 7a is obtained by first forming a solid electrolyte layer for an inner layer for filling the pores (recesses) of the dielectric layer 5 and then forming a solid electrolyte layer for an outer layer for covering the entire dielectric layer 5.

The thickness of the solid electrolyte layer 7a is preferably 2 μm to 20 μm.

The conductive layer 7b is formed by applying a conductive paste such as a carbon paste, a graphene paste, or a silver paste to a surface of the solid electrolyte layer 7a by a method such as immersion coating, screen printing, transfer printing, inkjet printing, dispensing, or spray coating.

Preferably, the conductive layer 7b is a carbon layer, a graphene layer, or a silver layer formed as described above. The conductive layer 7b may be a composite layer in which a silver layer is disposed on a carbon layer or a graphene layer, or a mixed layer containing a mixture of a carbon paste or a graphene paste with a silver paste.

The thickness of the conductive layer 7b is preferably 2 μm to 20 μm.

The cathode 7 is exposed at the second end surface 9b of the resin molding 9 and connected to the second external electrode 13. More specifically, the conductive layer 7b of the cathode 7 is exposed at the second end surface 9b of the resin molding 9 and connected to the second external electrode 13.

The cathode 7 may further include a cathode lead-out layer on a surface of the conductive layer 7b. In this case, the cathode lead-out layer may be exposed at the second end surface 9b of the resin molding 9 and connected to the second external electrode 13.

The cathode lead-out layer is made of metal foil, a resin electrode layer, or the like, for example.

The sealing resin 8 contains at least a resin, and preferably contains a resin and filler.

Preferred examples of the resin include an epoxy resin, a phenolic resin, a polyimide resin, a silicone resin, a polyamide resin, and a liquid crystal polymer.

Preferred examples of the filler include silica particles, alumina particles, and metal particles.

Preferably, the sealing resin 8 includes a material containing a solid epoxy resin, a phenolic resin and silica particles.

In use of the solid sealing resin 8, the resin molding 9 is preferably formed by a method that uses a resin mold such as a compression mold or a transfer mold, with a compression mold being more preferred. In use of the liquid sealing resin 8, the resin molding is preferably formed by a method that uses a dispenser or printing. In particular, preferably, the stack 30 is sealed by the sealing resin 8 using a compression mold to produce the resin molding 9.

The resin molding 9 may have rounded corners. The corners of the resin molding 9 may be rounded by barrel polishing, for example.

The first external electrode 11 is connected to the anode 3 exposed at the first end surface 9a of the resin molding 9.

The second external electrode 13 is connected to each cathode 7 exposed at the second end surface 9b of the resin molding 9.

Preferably, the first external electrode 11 and the second external electrode 13 are each formed by at least one method selected from the group consisting of immersion coating, screen printing, transfer printing, inkjet printing, dispensing, spray coating, brush coating, drop casting, electrostatic coating, plating, and sputtering.

Preferably, the first external electrode 11 includes a resin electrode layer containing a conductive component and a resin component. The resin component in the first external electrode 11 improves the adhesion between the first external electrode 11 and the sealing resin 8, resulting in higher reliability.

Preferably, the second external electrode 13 includes a resin electrode layer containing a conductive component and a resin component. The resin component in the second external electrode 13 improves the adhesion between the second external electrode 13 and the sealing resin 8, resulting in higher reliability.

Preferably, the conductive component mainly contains an elemental metal such as silver, copper, nickel, or tin or an alloy containing at least one of these metals, for example.

Preferably, the resin component mainly contains an epoxy resin, a phenolic resin, or the like.

The resin electrode layers are formed, for example, by a method such as immersion coating, screen printing, transfer printing, inkjet printing, dispensing, spray coating, brush coating, drop casting, or electrostatic coating. In particular, preferably, the resin electrode layers are printed resin electrode layers formed by applying a conductive paste by screen printing. When the resin electrode layers are formed by applying a conductive paste by screen printing, the first external electrode 11 and the second external electrode 13 tend to be flat, as compared to when the resin electrode layers are formed by applying a conductive paste by immersion coating. In other words, the thickness of the first external electrode 11 and the thickness of the second external electrode 13 tend to be uniform.

One or both of the first external electrode 11 and the second external electrode 13 may include a plating layer formed by plating. Examples of the plating layer include a zinc-silver-nickel layer, a silver-nickel layer, a nickel layer, a zinc-nickel-gold layer, a nickel-gold layer, a zinc-nickel-copper layer, and a nickel-copper layer. Preferably, such a plating layer is sequentially overlaid, for example, by a copper plating layer, a nickel plating layer, and a tin plating layer (alternatively, one or some of these plating layers may be excluded).

One or both of the first external electrode 11 and the second external electrode 13 may include a resin electrode layer and a plating layer. For example, the first external electrode 11 may include a resin electrode layer connected to the anode 3 and an outer plating layer on a surface of the resin electrode layer on the side opposite to the anode 3. The first external electrode 11 may include an inner plating layer connected to the anode 3, a resin electrode layer covering the inner plating layer, and an outer plating layer on the surface of the resin electrode layer away from the anode 3.

The following describes the form of the anode, which is a characteristic feature of the electrolytic capacitor of the present invention.

Figure 3:
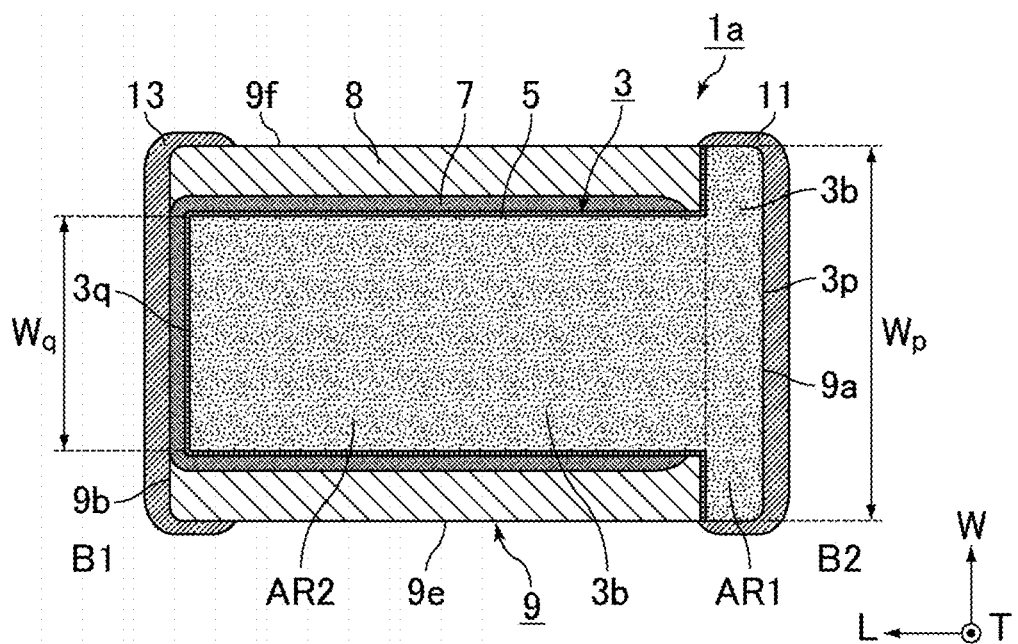
FIG. 3 is a schematic cross-sectional view taken along a line B1-B2 in FIG. 2.

FIG. 3 is a schematic cross-sectional view taken along a line B1-B2 in FIG. 2.

As shown in FIG. 3, when viewed in the thickness direction T, the anode 3 includes a first anode region AR1 and a second anode region AR2.

The first anode region AR1 includes a first outer edge 3p connected to a portion on the first end surface 9a of the resin molding 9 at the first external electrode 11. More specifically, the first outer edge 3p of the anode 3 is exposed at the first end surface 9a of the resin molding 9, and the first outer edge 3p of the anode 3 is connected to the first external electrode 11. The first outer edge 3p is positioned closest to the first external electrode 11 in the length direction L within the outer edge of the anode 3.

The second anode region AR2 includes a second outer edge 3q positioned closest to the second external electrode 13 in the length direction L within the outer edge of the anode 3.

In the width direction W, a length Wp of the first outer edge 3p is greater than a length Wq of the second outer edge 3q. This increases the contact area between the anode 3 and the first external electrode 11, as compared to the case where the length in the width direction W of the anode 3 is constant in the length direction L and the same as the length Wq in the width direction W of the second outer edge 3q, thus improving the adhesion between the anode 3 and the first external electrode 11. As a result, removal of the first external electrode 11 by thermal stress, penetration of moisture from outside to an interface between the anode 3 and the first external electrode 11, and the like are reduced or prevented, whereby the electrolytic capacitor 1a with high reliability is achieved.

In the electrolytic capacitor 1a, the first anode region AR1 is in contact with the second anode region AR2 in the length direction L. More specifically, the second anode region AR2 protrudes from the first anode region AR1 in the length direction L. The entirety of the width of the first anode region AR1 may not be in contact with the second anode region AR2 in the length direction L.

The first anode region AR1 of the electrolytic capacitor 1a includes regions protruding with respect to the second anode region AR2 to opposite sides in the width direction W. The first anode region AR1 may include a region protruding with respect to the second anode region AR2 to one side in the width direction W. In the first anode region AR1, preferably, end surfaces of the regions protruding with respect to the second anode region AR2 in the width direction W, which are positioned closer to the second external electrode 13, are parallel to the width direction W as shown in FIG. 3, but these end surfaces may not be parallel to the width direction W.

In the electrolytic capacitor 1a, a length in width direction W of the first anode region AR1 and a length in the width direction W of the second anode region AR2 are constant in the length direction L. More specifically, the length in the width direction W of the first anode region AR1 is constant in the length direction L and the same as the length Wp in the width direction W of the first outer edge 3p. The length in the width direction W of the second anode region AR2 is constant in the length direction L and the same as the length Wq in the width direction W of the second outer edge 3q.

The length in the width direction W of the first anode region AR1 and the length in the width direction W of the second anode region AR2 may not be constant in the length direction L.

Figure 4:
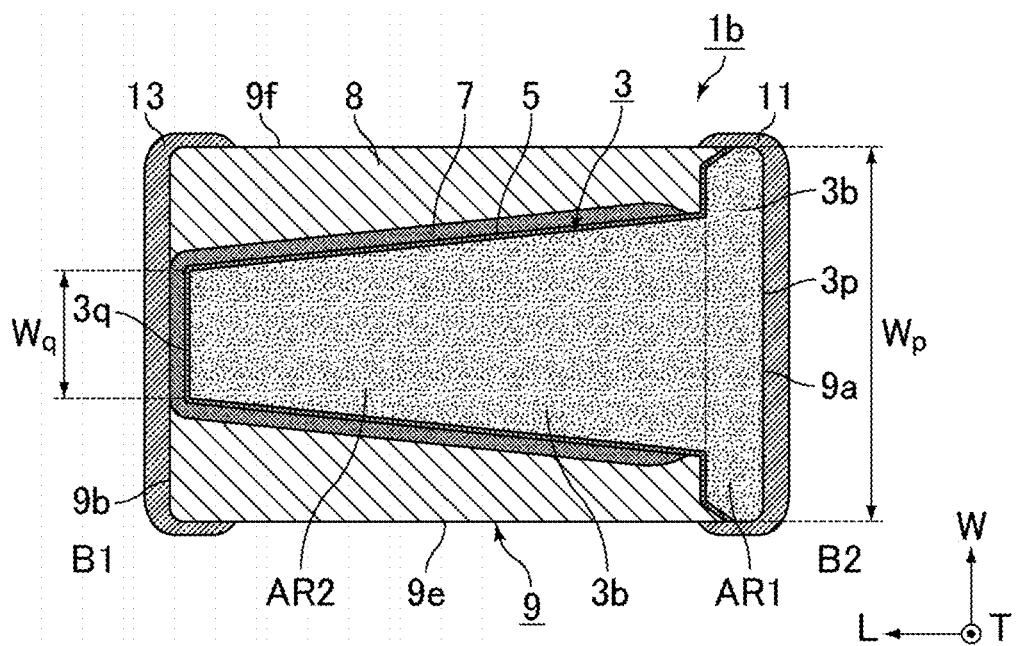
FIG. 4 is a schematic cross-sectional view showing the form of an anode by way of an example different from the one shown in FIG. 3.

FIG. 4 is a schematic cross-sectional view showing the form of the anode by way of an example different from the one shown in FIG. 3. As in an electrolytic capacitor 1b shown in FIG. 4, the length in the width direction W of the first anode region AR1 may increase toward the first external electrode 11 in the length direction L. The length in the width direction W of the second anode region AR2 may decrease toward the second external electrode 13 in the length direction L.

In the electrolytic capacitor 1a, the anode 3 is connected to the first external electrode 11 not only at the first end surface 9a of the resin molding 9 but also at both the first side surface 9e and the second side surface 9f in the first anode region AR1. This significantly increases the contact area between the anode 3 and the first external electrode 11, thus sufficiently increasing the adhesion between the anode 3 and the first external electrode 11.

The anode 3 may not be connected to the first external electrode 11 at the first side surface 9e or the second side surface 9f of the resin molding 9 in the first anode region AR1.

Figure 5:
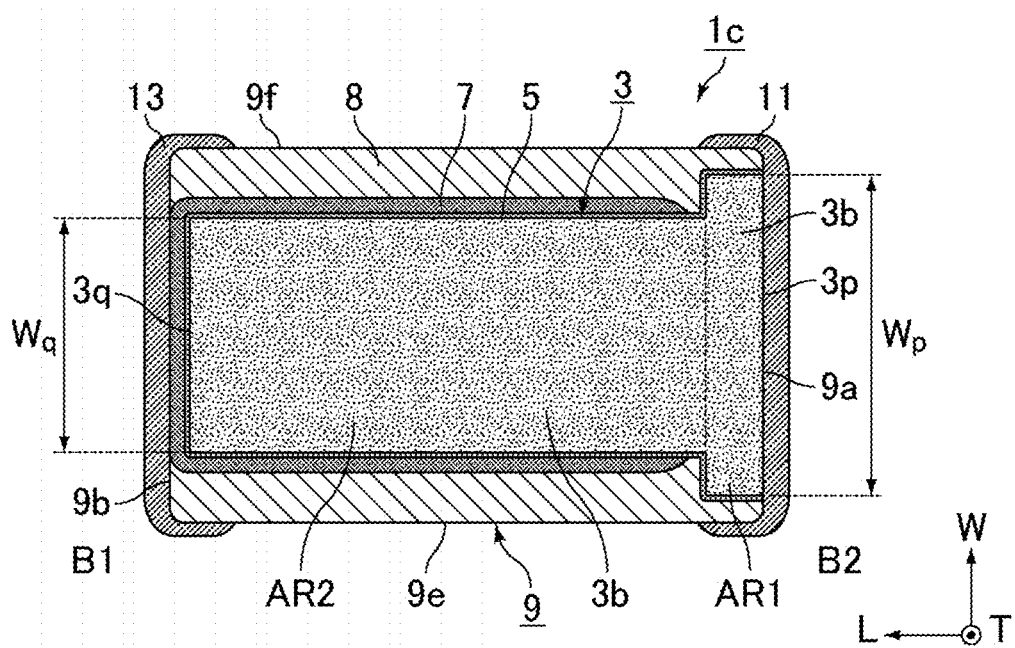
FIG. 5 is a schematic cross-sectional view showing the form of connection between the anode and a first external electrode by way of an example different from the one shown in FIG. 3.

FIG. 5 is a schematic cross-sectional view showing the form of connection between the anode and a first external electrode by way of an example different from the one shown in FIG. 3. As in an electrolytic capacitor 1c shown in FIG. 5, the anode 3 may be connected to the first external electrode 11 only at the first end surface 9a of the resin molding 9 in the first anode region AR1.

The anode 3 may be connected to the first external electrode 11 not only at the first end surface 9a of the resin molding 9 but also at one of the first side surface 9e and the second side surface 9f in the first anode region AR1. In other words, the anode 3 may be connected to the first external electrode 11 at the first end surface 9a and the first side surface 9e of the resin molding 9 or at the first end surface 9a and the second side surface 9f of the resin molding 9 in the first anode region AR1.

The method of producing an electrolytic capacitor of the present invention includes: forming an anode component including an anode having a porous portion at a surface thereof, and having a shape including a trunk portion extending in a width direction and an elongated portion protruding from the trunk portion in a length direction perpendicular to the width direction thereof; forming a capacitor element component by sequentially forming a dielectric layer on a surface of the porous portion and forming a cathode on a surface of the porous portion of the anode component; forming a capacitor element by cutting the capacitor element component along a cutting line in the width direction so that each of the resulting capacitor elements when viewed in a thickness direction perpendicular to the width direction and the length direction includes the anode, the dielectric layer, and the cathode, the anode including a first anode region including a first outer edge corresponding to the cutting line and a second anode region including a second outer edge positioned furthest away from the first anode region in the length direction within an outer edge of the elongated portion, and in which a length of the first outer edge of the anode is greater than a length of the second outer edge of the anode in the width direction; sealing the capacitor element component with a sealing resin so as to form a resin molding having a first end surface and a second end surface opposite to each other in the length direction, the first end surface having the first outer edge of the anode exposed therefrom, the second end surface having the cathode exposed therefrom; forming a first external electrode on the first end surface of the resin molding and connected to the first outer edge of the anode exposed at the first end surface of the resin molding; and forming a second external electrode on the second end surface of the resin molding and connected to the cathode exposed at the second end surface of the resin molding.

In the method of producing an electrolytic capacitor of the present invention, the first anode region may be a region including the trunk portion that remains after cutting, and the second anode region may be a region including the elongated portion. In the method of producing an electrolytic capacitor of the present invention, the length in the width direction of the first anode region and the length in the width direction of the second anode region may be respectively constant in the length direction. In the method of producing an electrolytic capacitor of the present invention, the forming of the resin molding may be carried out between the forming of the capacitor element component and the forming of the capacitor element. Such a case is described as a method of producing the electrolytic capacitor of Embodiment 1 of the present invention, i.e., a method of producing the electrolytic capacitor 1a shown in FIG. 1, FIG. 2, and FIG. 3.

Forming Resin Molding

The forming a resin molding in which the resin molding 9 is formed includes forming an anode component, forming a capacitor element component, forming a sealed body, and forming capacitor elements. Each step is described below.

Forming Anode Component

Figure 6:
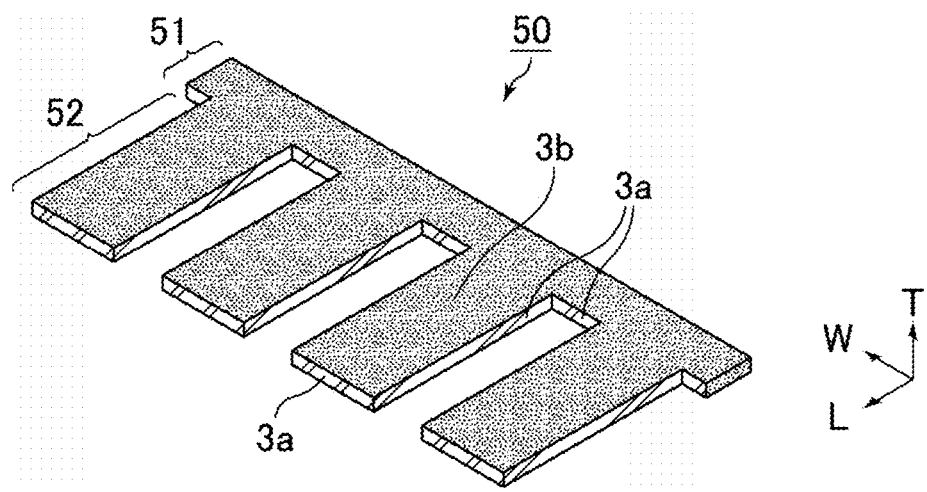
FIG. 6 is a schematic perspective view showing an example of forming an anode component in a method of producing the electrolytic capacitor of Embodiment 1 of the present invention.

FIG. 6 is a schematic perspective view showing an example of the forming an anode component in the method of producing the electrolytic capacitor of Embodiment 1 of the present invention. First, the valve-action metal substrate 3a including the porous portion 3b at a surface thereof is provided. Then, the valve-action metal substrate 3a is cut by laser, for example, whereby an anode component 50 as shown in FIG. 6 is formed which includes the porous portion 3b at a surface thereof and has a shape including a trunk portion 51 extending in the width direction W, multiple elongated portions 52 protruding from the trunk portion 51 in the length direction L perpendicular to the width direction W.

In this step, the anode component 50 is formed in a shape including the multiple elongated portions 52 protruding from the trunk portion 51 in the length direction L, but the anode component 50 may be formed in a shape including one elongated portion 52 protruding from the trunk portion 51 in the length direction L.

Forming Capacitor Element Component

Figure 7:
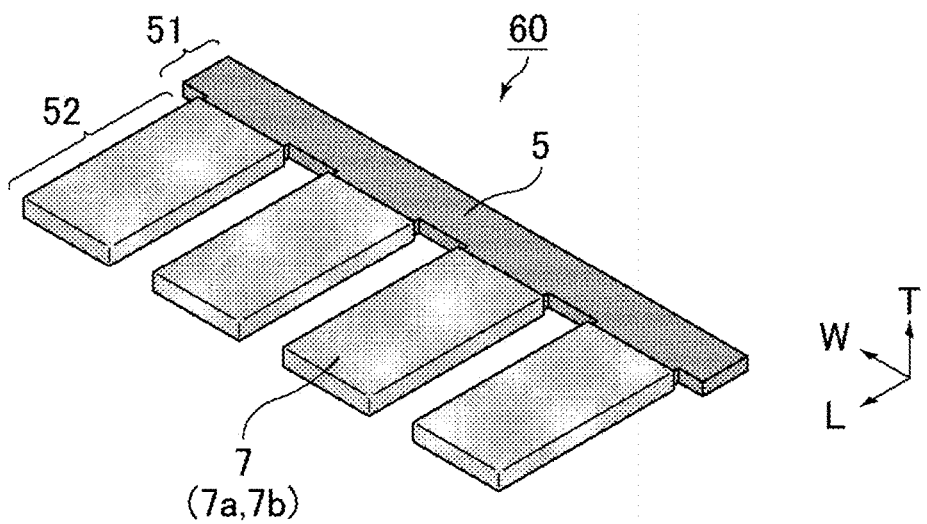
FIG. 7 is a schematic perspective view showing an example of forming a capacitor element component in the method of producing the electrolytic capacitor of Embodiment 1 of the present invention.

FIG. 7 is a schematic perspective view showing an example of the forming a capacitor element component in the method of producing the electrolytic capacitor of Embodiment 1 of the present invention. First, the anode component 50 is anodized to form the dielectric layer 5 on a surface of the porous portion 3b of the anode component 50 and also on a cut surface of the anode component 50. Then, the solid electrolyte layer 7a is formed on a surface of the dielectric layer 5 by a method such as immersion coating. Further, the conductive layer 7b is formed on a surface of the solid electrolyte layer 7a by a method such as immersion coating. The dielectric layer 5 and the cathodes 7 including the solid electrolyte layer 7a and the conductive layer 7b are sequentially formed on the surface of the porous portion 3b of the anode component 50 as described above, whereby a capacitor element component 60 as shown in FIG. 7 is formed.

Forming Sealed Body

Figure 8:
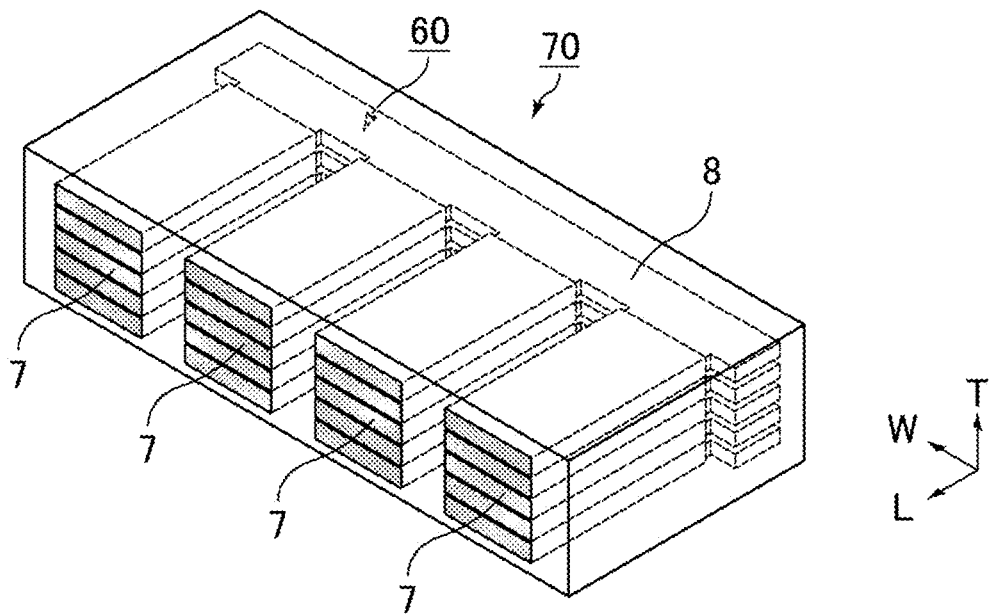
FIG. 8 is a schematic perspective view showing an example of forming a sealed body in the method of producing the electrolytic capacitor of Embodiment 1 of the present invention.

FIG. 8 is a schematic perspective view showing an example of the forming a sealed body in the method of producing the electrolytic capacitor of Embodiment 1 of the present invention. After multiple capacitor element components 60 are stacked, a compression mold or the like is used to seal the stack of the capacitor element components 60 by the sealing resin 8, whereby a sealed body 70 as shown in FIG. 8 is formed.

The forming the sealed body 70 involves sealing by the sealing resin 8 such that the cathodes 7 in the respective elongated portions 52 of the anode component 50 are exposed at one end surface of the sealed body 70 in the length direction L. The cathodes 7 can be exposed at one end surface of the sealed body 70 by, for example, a method involving sealing while masking an exposure-target portion of the cathodes 7 or a method involving exposing the cathodes 7 by scraping the sealing resin 8 after sealing.

In this step, in forming the sealed body 70, the stack of the multiple capacitor element components 60 is sealed by the sealing resin 8, but one capacitor element component 60 may be sealed by the sealing resin 8.

Forming Capacitor Elements

Figure 9:
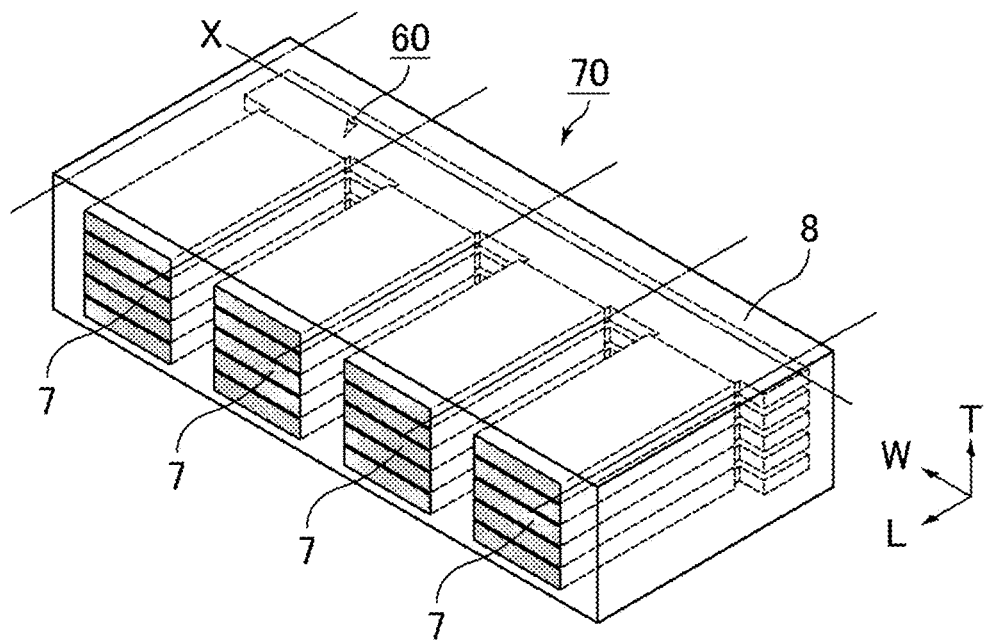
FIG. 9 is a schematic perspective view showing an example of forming capacitor elements in the method of producing the electrolytic capacitor of Embodiment 1 of the present invention.
Figure 10:
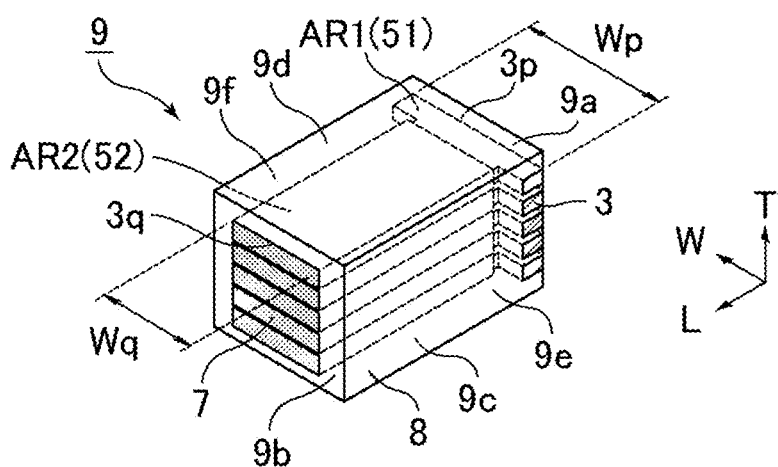
FIG. 10 is a schematic perspective view showing an example of the forming capacitor elements in the method of producing the electrolytic capacitor of Embodiment 1 of the present invention.

FIG. 9 and FIG. 10 are schematic perspective views each showing an example of the forming capacitor elements in the method of producing the electrolytic capacitor of Embodiment 1 of the present invention. The sealed body 70 is cut along cutting lines indicated by dash-dotted lines shown in FIG. 9 for singulation of the sealed body 70 into multiple resin moldings 9 each having a structure as shown in FIG. 10. As shown in FIG. 2, each of the resulting resin moldings 9 includes the capacitor elements 20 each including the anode 3, the dielectric layer 5, and the cathode 7, and the sealing resin 8 sealing the capacitor elements 20. In other words, the capacitor elements 20 are formed in this step.

In this step, in cutting the sealed body 70, the capacitor element component 60 is cut along a cutting line X in the width direction W in such a manner that a portion of the trunk portion 51 is left as shown in FIG. 9. By cutting in this manner, the anode 3 is formed which includes the first anode region AR1 including the first outer edge 3p and the second anode region AR2 including the second outer edge 3q as shown in FIG. 10 when viewed in the thickness direction T perpendicular to the width direction W and the length direction L. More specifically, the first anode region AR1 is a region including the trunk portion 51 that is left after cutting, and the second anode region AR2 is a region including the elongated portions 52. In other words, the first anode region AR1 is in contact with the second anode region AR2 in the length direction L.

The first outer edge 3p corresponds to the cutting line X and is exposed at the first end surface 9a of the resin molding 9. The second outer edge 3q is positioned furthest away from the first anode region AR1 in the length direction L within an outer edge of the elongated portions 52. In the width direction W, the length Wp of the first outer edge 3p is greater than the length Wq of the second outer edge 3q.

The length in the width direction W of the first anode region AR1 and the length in the width direction W of the second anode region AR2 are constant in the length direction L. More specifically, the length in the width direction W of the first anode region AR1 is constant in the length direction L and the same as the length Wp in the width direction W of the first outer edge 3p. The length in the width direction W of the second anode region AR2 is constant in the length direction L and the same as the length Wq in the width direction W of the second outer edge 3q.

In the present embodiment, the sealed body 70 is cut after the sealed body 70 is formed by sealing the capacitor element components 60 using the sealing resin 8, but the capacitor elements 20 may be sealed by the sealing resin 8 after the capacitor elements 20 are formed by cutting the capacitor element components 60. In other words, the forming a resin molding may include, after the forming capacitor elements, forming a sealed body by sealing the capacitor elements using the sealing resin.

Forming First External Electrode

The first external electrode 11 connected to the first outer edge 3p of the anode 3 exposed at the first end surface 9a is formed on the first end surface 9a of the resin molding 9. Here, as shown in FIG. 1, FIG. 2, and FIG. 3, the first external electrode 11 is formed to extend from the first end surface 9a of the resin molding 9 to a portion of the bottom surface 9c, a portion of the top surface 9d, a portion of the first side surface 9e, and a portion of the second side surface 9f.

In this step, preferably, the first external electrode 11 is formed by at least one method selected from the group consisting of immersion coating, screen printing, transfer printing, inkjet printing, dispensing, spray coating, brush coating, drop casting, electrostatic coating, plating, and sputtering. Here, preferably, the first external electrode 11, more specifically, the resin electrode layer as the first external electrode 11, is formed using a conductive paste containing a conductive component and a resin component by immersion coating, screen printing, transfer printing, inkjet printing, dispensing, spray coating, brush coating, drop casting, or electrostatic coating.

Forming Second External Electrode

The second external electrode 13 connected to the cathode 7 (here, the conductive layer 7b) exposed at the second end surface 9b is formed on the second end surface 9b of the resin molding 9. Here, as shown in FIG. 1, FIG. 2, and FIG. 3, the second external electrode 13 is formed to extend from the second end surface 9b of the resin molding 9 to a portion of the bottom surface 9c, a portion of the top surface 9d, a portion of the first side surface 9e, and a portion of the second side surface 9f.

In this step, preferably, the second external electrode 13 is formed by at least one method selected from the group consisting of immersion coating, screen printing, transfer printing, inkjet printing, dispensing, spray coating, brush coating, drop casting, electrostatic coating, plating, and sputtering. Here, preferably, the second external electrode 13, more specifically, the resin electrode layer as the second external electrode 13, is formed using a conductive paste containing a conductive component and a resin component by immersion coating, screen printing, transfer printing, inkjet printing, dispensing, spray coating, brush coating, drop casting, or electrostatic coating.

The forming a first external electrode and the forming a second external electrode may be performed separately or simultaneously. When these steps are performed separately, the order is not limited.

Thus, the electrolytic capacitor 1a shown in FIG. 1, FIG. 2, and FIG. 3 is produced.

Embodiment 2

In the electrolytic capacitor of the present invention, the porous portion may be thinner at a position including at least a portion of the first outer edge in the first anode region than that of the porous portion in the second anode region. Such a case is described as an electrolytic capacitor of Embodiment 2 of the present invention. The electrolytic capacitor of Embodiment 2 of the present invention is the same as the electrolytic capacitor of Embodiment 1 of the present invention, except for the form of the porous portion in the first anode region.

Figure 11:
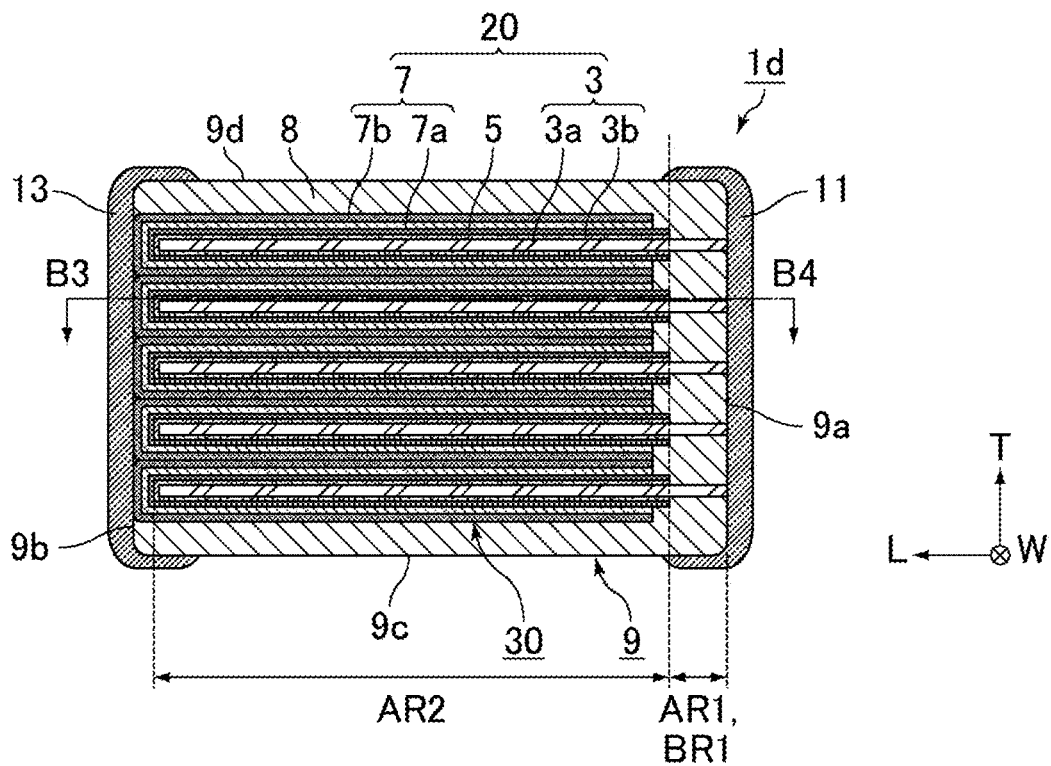
FIG. 11 is a schematic cross-sectional view showing an electrolytic capacitor of Embodiment 2 of the present invention.
Figure 12:
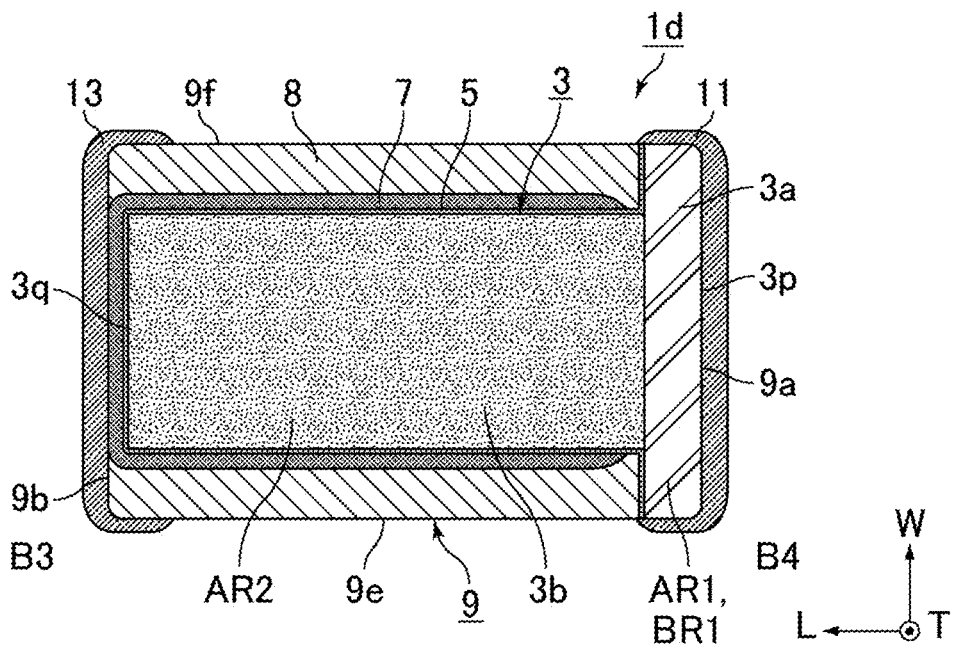
FIG. 12 is a schematic cross-sectional view taken along a line B3-B4 in FIG. 11.

FIG. 11 is a schematic cross-sectional view showing the electrolytic capacitor of Embodiment 2 of the present invention. FIG. 12 is a schematic cross-sectional view taken along a line B3-B4 in FIG. 11. In an electrolytic capacitor 1d shown in FIG. 11 and FIG. 12, the first anode region AR1 includes, at a position including at least a portion of the first outer edge 3p, a first region BR1 where the porous portion 3b is thinner than that in the second anode region AR2. Here, an example is shown in which the first region BR1 without the porous portion 3b extends over the entirety of the first anode region AR1. The first region BR1 in the first anode region AR1 of the electrolytic capacitor 1d results in an increase in the exposed region of the sealing resin 8 that tends to have high adhesion with the first external electrode 11, in contrast to a decrease in the exposed region of the porous portion 3b that tends to have low adhesion with the first external electrode 11, at the first end surface 9a of the resin molding 9 in contact with the first external electrode 11. Thus, as compared to the electrolytic capacitor 1a, the electrolytic capacitor 1d has high adhesion between the first end surface 9a of the resin molding 9 and the first external electrode 11, which tends to improve the reliability.

It suffices as long as the porous portion 3b in the first region BR1 is thinner than that in the second anode region AR2 on at least one main surface of the valve-action metal substrate 3a. Such a form of the first region BR1 includes a form in which the porous portion 3b is absent on at least one main surface of the valve-action metal substrate 3a, and a form in which while the porous portion 3b is present on at least one main surface of the valve-action metal substrate 3a, the porous portion 3b is thinner than that in the second anode region AR2. In the first region BR1, the thickness of the porous portion 3b may be uniform, or there may be a region with a different thickness of the porous portion 3b. The thickness of the porous portion 3b on one main surface of the valve-action metal substrate 3a may be the same as or different from the thickness of the porous portion 3b on the other main surface of the valve-action metal substrate 3a.

It suffices as long as the first region BR1 is present at a position including at least a portion of the first outer edge 3p in the first anode region AR1. Such a form of the first region BR1 includes a form in which the first region BR1 extends over the entirety of the first anode region AR1, and a form in which the first anode region AR1 includes the first region BR1 and a second region where the thickness of the porous portion 3b is the same as that in the second anode region AR2.

There may be one first region BR1 or multiple first regions BR1. When multiple first regions BR1 are present, as long as at least one first region BR1 is present at a position including at least a portion of the first outer edge 3p in the first anode region AR1, the other first region(s) BR1 may be present at a position not including the first outer edge 3p in the first anode region AR1. When multiple first regions BR1 are present, the porous portions 3b in the first regions BR1 may have the same thickness or different thicknesses.

In the method of producing an electrolytic capacitor of the present invention, the method may further include, between the forming of the anode component and the forming of the capacitor element component, removing at least a portion of the porous portion in the trunk portion so as to form a first region where the porous portion is thinner than that of the porous portion in the elongated portion. Such a case is described below as a method of producing the electrolytic capacitor of Embodiment 2 of the present invention, i.e., a method of producing the electrolytic capacitor 1d shown in FIG. 11 and FIG. 12. The method of producing the electrolytic capacitor of Embodiment 2 of the present invention is the same as the method of producing the electrolytic capacitor of Embodiment 1 of the present invention, except that in the method of producing the electrolytic capacitor of Embodiment 2, the forming a resin molding includes removing the porous portion, which is described below, between the forming an anode component and the forming a capacitor element component.

Removing Porous Portion

Figure 13:
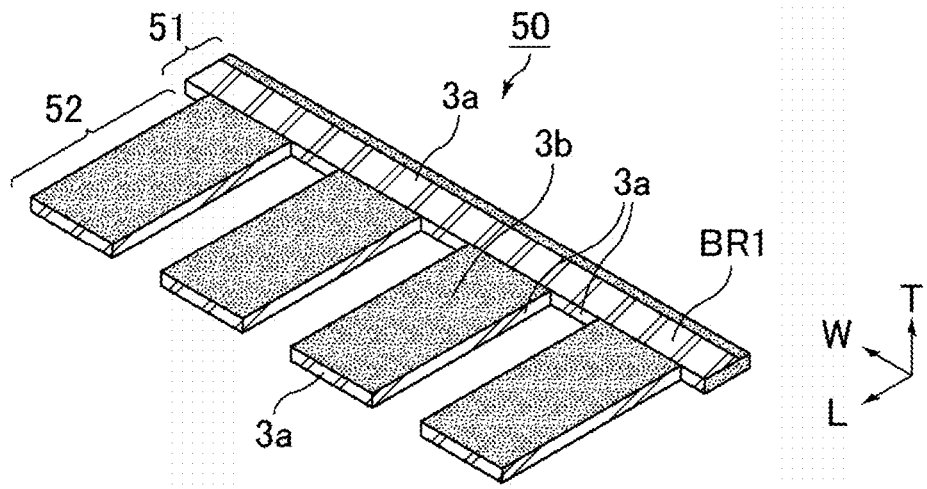
FIG. 13 is a schematic perspective view showing an example of removing a porous portion in a method of producing the electrolytic capacitor of Embodiment 2 of the present invention.

FIG. 13 is a schematic perspective view showing an example of the removing a porous portion in the method of producing the electrolytic capacitor of Embodiment 2 of the present invention. The anode component 50 formed in the forming an anode component is subjected to laser half-cutting or the like to remove at least a portion of the porous portion 3b on the trunk portion 51. Thus, as shown in FIG. 13, the first region BR1 where the porous portion 3b is thinner than that in the elongated portions 52 is formed in the trunk portion 51. Here, an example is shown in which the first region BR1 without the porous portion 3b is formed in the trunk portion 51 by completely removing the porous portion 3b on the trunk portion 51 on the side adjacent to the elongated portions 52 and in a region including a boundary between the trunk portion 51 and the elongated portions 52.

In the forming capacitor elements, which is performed later, the sealed body 70 is cut in such a manner that a cutting line X shown in FIG. 9 runs through the first region BR1.

Modified Example 1 of Embodiment 2

In the electrolytic capacitor of Embodiment 2 of the present invention, the electrolytic capacitor may further include an insulating layer on a surface of the anode in the first region. In the electrolytic capacitor of Embodiment 2 of the present invention, the anode may include a first anode main surface and a second anode main surface opposite to each other in the thickness direction in the first anode region, and the insulating layer may be on one or both of the first anode main surface and the second anode main surface of the anode in the first region. Such a case is described as an electrolytic capacitor of Modified Example 1 of Embodiment 2 of the present invention. The electrolytic capacitor of Modified Example 1 of Embodiment 2 of the present invention is the same as the electrolytic capacitor of Embodiment 2 of the present invention, except that the electrolytic capacitor of Modified Example 1 of Embodiment 2 includes an insulating layer in the first region.

Figure 14:
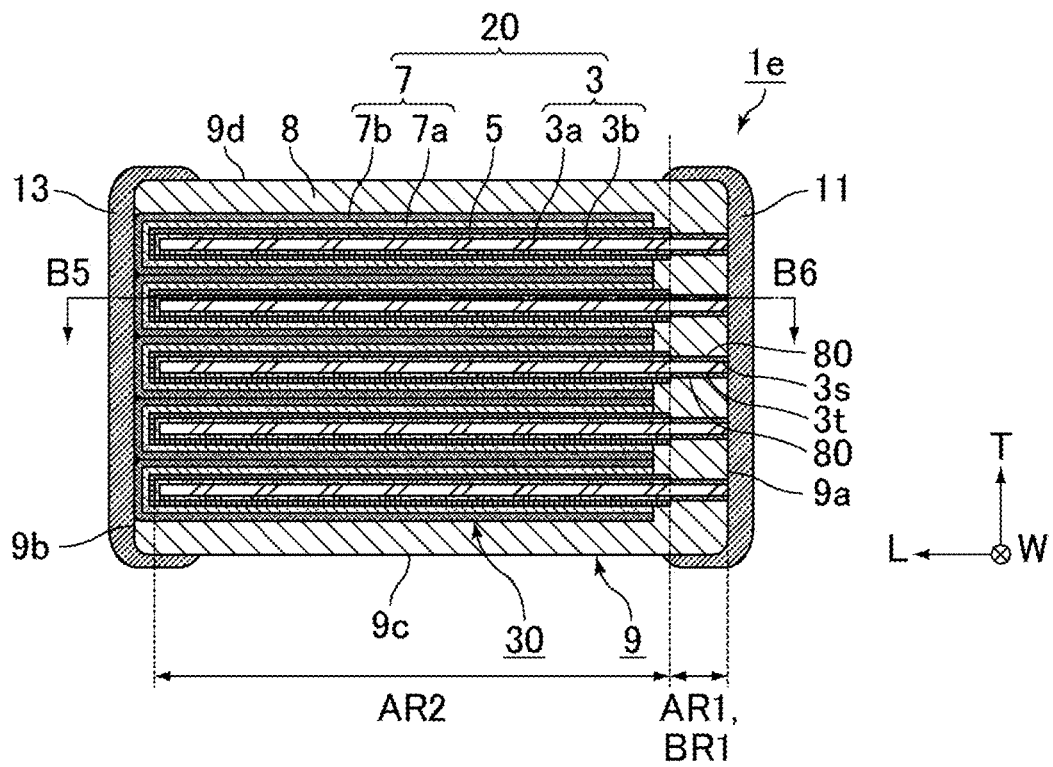
FIG. 14 is a schematic cross-sectional view showing an electrolytic capacitor of Modified Example 1 of Embodiment 2 of the present invention.
Figure 15:
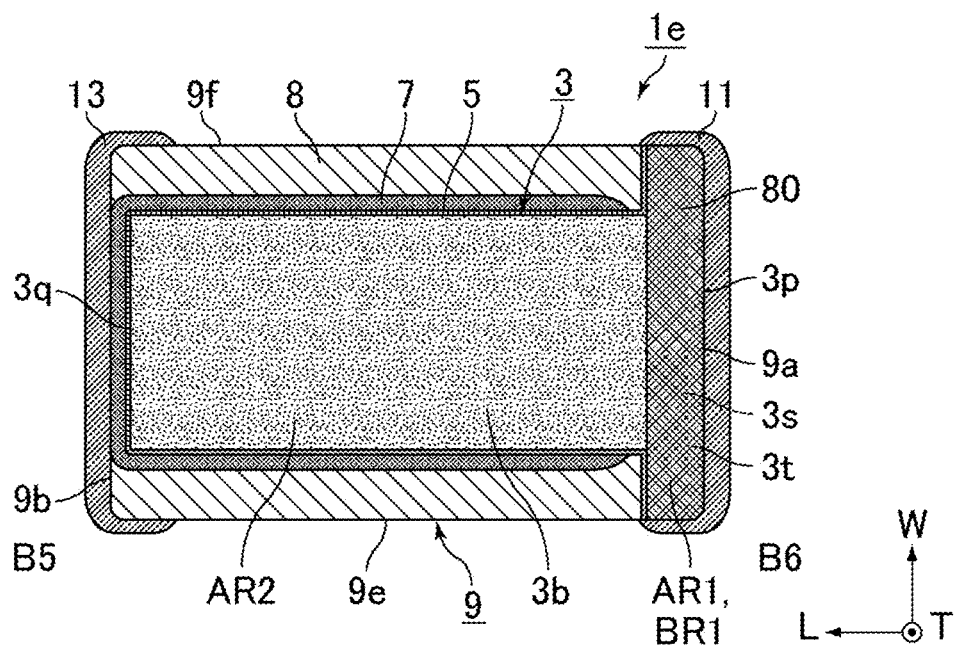
FIG. 15 is a schematic cross-sectional view taken along a line B5-B6 in FIG. 14.

FIG. 14 is a schematic cross-sectional view showing the electrolytic capacitor of Modified Example 1 of Embodiment 2 of the present invention. FIG. 15 is a schematic cross-sectional view taken along a line B5-B6 in FIG. 14. In an electrolytic capacitor 1e shown in FIG. 14 and FIG. 15, an insulating layer 80 is on one or both of a first anode main surface 3s and a second anode main surface 3t of the anode 3 in the first region BR1. Here, an example is shown in which the insulating layer 80 is on both the first anode main surface 3s and the second anode main surface 3t of the anode 3 in the first region BR1. The insulating layer 80 may be on one of the first anode main surface 3s and the second anode main surface 3t of the anode 3 in the first region BR1.

The first anode main surface 3s and the second anode main surface 3t of the anode 3 are opposite to each other in the thickness direction T in the first anode region AR1. The first anode main surface 3s and the second anode main surface 3t are outermost surfaces of the anode 3. For example, as in the electrolytic capacitor 1e, in the first region BR1 without the porous portion 3b, the main surfaces of the valve-action metal substrate 3a define the first anode main surface 3s and the second anode main surface 3t.

The insulating layer 80 in the first region BR1 results in an increase in the exposed region of the insulating layer 80 that tends to have high adhesion with the first external electrode 11, in contrast to a decrease in the exposed region of the porous portion 3b that tends to have low adhesion with the first external electrode 11, at the first end surface 9a of the resin molding 9 in contact with the first external electrode 11. Thus, as compared to the electrolytic capacitor 1a, the electrolytic capacitor 1e has high adhesion between the first end surface 9a of the resin molding 9 and the first external electrode 11, which tends to improve the reliability.

Preferably, the insulating layer 80 contains an insulating resin.

Preferred examples of the insulating resin include an epoxy resin and a polyimide resin.

Preferably, the insulating layer 80 does not contain filler in terms of adhesion with the first external electrode 11.

Preferably, the thickness of the insulating layer 80 is not greater than the thickness of the porous portion 3b in the second anode region AR2. The thickness of the insulating layer 80 on the first anode main surface 3s of the anode 3 may be the same as or different from the thickness of the insulating layer 80 on the second anode main surface 3t of the anode 3.

In the method of producing the electrolytic capacitor of Embodiment 2 of the present invention, the method may further include, between the removing of the porous portion and the forming of the capacitor element component, forming an insulating layer on a surface of the trunk portion in the first region. In the method of producing the electrolytic capacitor of Embodiment 2 of the present invention, the insulating layer may be formed on one or both of a first anode main surface and a second anode main surface opposite to the first anode main surface in the thickness direction of the trunk portion in the first region. Such a case is described as the method of producing the electrolytic capacitor of Modified Example 1 of Embodiment 2 of the present invention, i.e., a method of producing the electrolytic capacitor 1e shown in FIG. 14 and FIG. 15. The method of producing the electrolytic capacitor of Modified Example 1 of Embodiment 2 of the present invention is the same as the method of producing the electrolytic capacitor of Embodiment 2 of the present invention, except that in the method of producing an electrolytic capacitor of Modified Example 1 of Embodiment 2, the forming a resin molding includes forming an insulating layer, which is described below, between the removing the porous portion and the forming a capacitor element component.

Forming Insulating Layer

Figure 16:
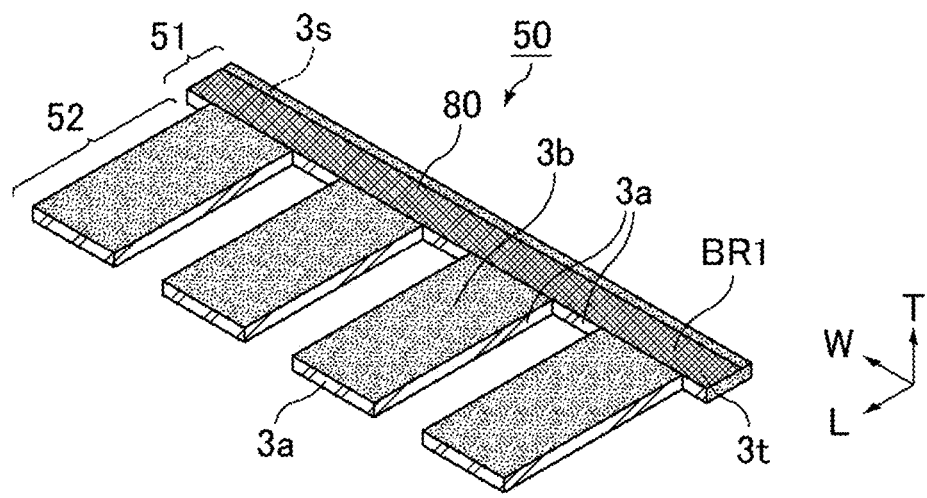
FIG. 16 is a schematic perspective view showing an example of forming an insulating layer in a method of producing the electrolytic capacitor of Modified Example 1 of Embodiment 2 of the present invention.

FIG. 16 is a schematic perspective view showing an example of the forming an insulating layer in the method of producing the electrolytic capacitor of Modified Example 1 of Embodiment 2 of the present invention. In the first region BR1 formed in the removing the porous portion, the insulating layer 80 is formed by transfer printing or the like on one or both of the first anode main surface 3s and the second anode main surface 3t opposite to the first anode main surface 3s in the thickness direction T of the trunk portion 51 as shown in FIG. 16. Here, an example is shown in which the insulating layer 80 is formed on both the first anode main surface 3s and the second anode main surface 3t of the trunk portion 51 in the first region BR1.

Modified Example 2 of Embodiment 2

In the electrolytic capacitor of Modified Example 1 of Embodiment 2 of the present invention, the anode may further include a first anode end surface intersecting the first anode main surface and the second anode main surface and positioned closer to the second external electrode in the first anode region, and the insulating layer may be also on the first anode end surface of the anode in the first anode region. Such a case is described below as an electrolytic capacitor of Modified Example 2 of Embodiment 2 of the present invention. The electrolytic capacitor of Modified Example 2 of Embodiment 2 of the present invention is the same as the electrolytic capacitor of Modified Example 1 of Embodiment 2 of the present invention, except that the electrolytic capacitor of Modified Example 2 of Embodiment 2 includes the insulating layer also on the first anode end surface of the anode.

Figure 17:
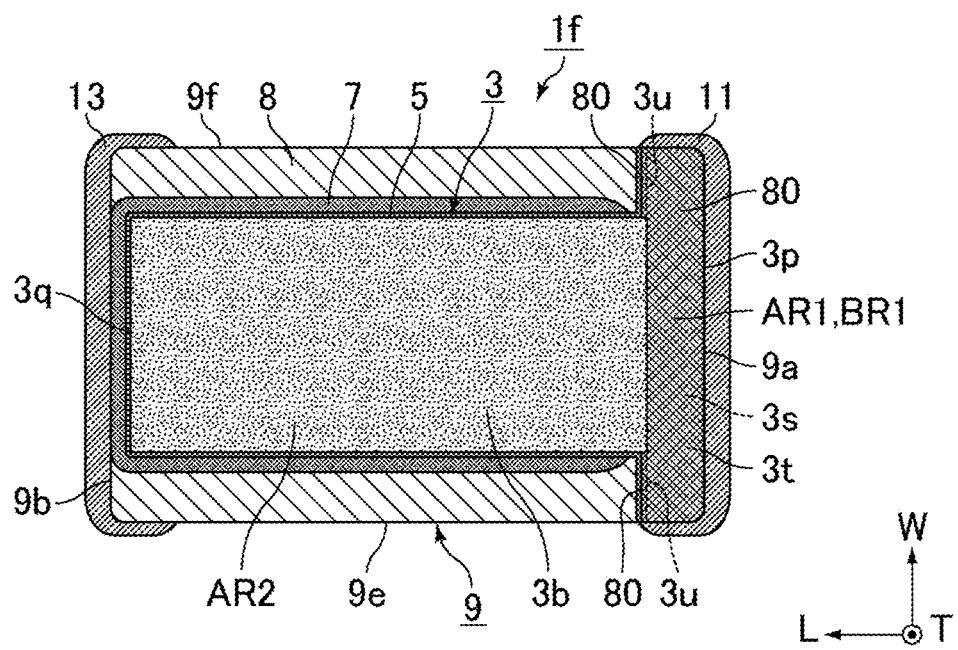
FIG. 17 is a schematic cross-sectional view showing an electrolytic capacitor of Modified Example 2 of Embodiment 2 of the present invention.

FIG. 17 is a schematic cross-sectional view showing the electrolytic capacitor of Modified Example 2 of Embodiment 2 of the present invention. An electrolytic capacitor if shown in FIG. 17 includes the insulating layer 80 also on a first anode end surface $3u$ of the anode 3 in the first anode region AR1. In the first anode region AR1, the first anode end surface $3u$ is intersecting the first anode main surface $3s$ and the second anode main surface $3t$ and positioned closer to the second external electrode 13.

The insulating layer 80 on the first anode end surface $3u$ prevents exposure of the valve-action metal substrate $3a$ at the first anode end surface $3u$. Thus, when forming the cathode 7 in the forming a capacitor element component, which is performed subsequently, conduction between the valve-action metal substrate $3a$ and the cathode 7 is prevented in the first anode end surface $3u$.

In the method of producing the electrolytic capacitor of Modified Example 1 of Embodiment 2 of the present invention, the insulating layer may be formed on the first anode end surface intersecting the first anode main surface and the second anode main surface and positioned closer to the elongated portions in the trunk portion. Such a case is described as a method of producing the electrolytic capacitor of Modified Example 2 of Embodiment 2 of the present invention, i.e., a method of producing the electrolytic capacitor if shown in FIG. 17. The method of producing the electrolytic capacitor of Modified Example 2 of Embodiment 2 of the present invention is the same as the method of producing the electrolytic capacitor of Modified Example 1 of Embodiment 2 of the present invention, except that in the method of producing the electrolytic capacitor of Modified Example 2 of Embodiment 2, the forming an insulating layer includes forming the insulating layer also on the first anode end surface of the anode.

Figure 18:
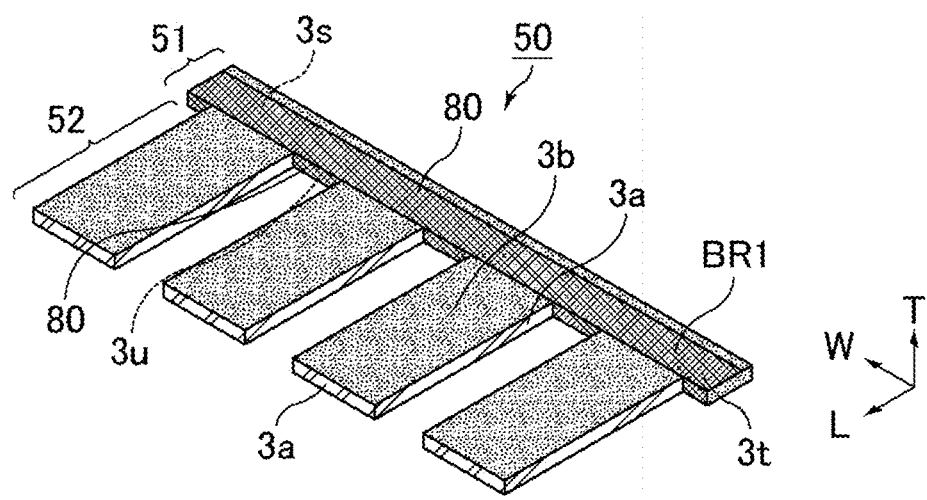
FIG. 18 is a schematic perspective view showing an example of forming an insulating layer in a method of producing the electrolytic capacitor of Modified Example 2 of Embodiment 2 of the present invention.

FIG. 18 is a schematic perspective view showing an example of the forming an insulating layer in the method of producing the electrolytic capacitor of Modified Example 2 of Embodiment 2 of the present invention. In the forming an insulating layer, which is described above, the insulating layer 80 is formed also on the first anode end surface $3u$ intersecting the first anode main surface $3s$ and the second anode main surface $3t$ and positioned closer to the elongated portions 52 in the trunk portion 51.

EXAMPLES

Examples that more specifically disclose the electrolytic capacitor of the present invention are described below. In the following examples, a solid electrolytic capacitor is described as the electrolytic capacitor of the present invention. The present invention is not limited to these examples.

Example 1

A solid electrolytic capacitor of Example 1 was produced by the following method.
Forming Resin Molding
In the forming a resin molding, the forming an anode component, the forming a capacitor element component, the forming a sealed body, and the forming capacitor elements were sequentially performed as described below.

Forming Anode Component
First, an aluminum chemical foil including aluminum foil as a valve-action metal substrate at a center thereof and an etched layer as a porous portion at a surface thereof was provided. Then, the aluminum chemical foil was cut by laser, whereby an anode component having a structure shown in FIG. 6 was formed.
Forming Capacitor Element Component
First, the anode component was immersed in an aqueous solution of ammonium adipate for anodization, whereby a dielectric layer was formed on a cut surface of the anode component. Then, the resulting structure was immersed in an aqueous dispersion of poly(3,4-ethylenedioxythiophene) and then dried, whereby a solid electrolyte layer was formed on a surface of the dielectric layer. Further, the resulting structure was immersed in a carbon paste and then immersed in a silver paste, whereby a conductive layer in which a carbon layer and a silver layer were sequentially stacked on the surface of the solid electrolyte layer was formed. In this manner, a capacitor element component having a structure shown in FIG. 7 was formed.
Forming Sealed Body
Multiple capacitor element components were stacked, and the resulting stack of the capacitor element components was then sealed by a sealing resin containing an epoxy resin and silica particles, whereby a sealed body having a structure shown in FIG. 8 was formed.
Forming Capacitor Elements
The sealed body was cut along the cutting lines indicated by the dash-dotted lines shown in FIG. 9 for singulation of the sealed body into structures such as the one shown in FIG. 10, more specifically, multiple resin moldings each including capacitor elements and a sealing resin.
Forming First External Electrode
The resin molding was immersed in the silver paste, whereby a first external electrode was formed to extend from a first end surface of the resin molding to a portion of a bottom surface, a portion of a top surface, a portion of a first side surface, and a portion of a second side surface of the resin molding.
Forming Second External Electrode
The resin molding was immersed in the silver paste, whereby a second external electrode was formed to extend from a second end surface of the resin molding to a portion of the bottom surface, a portion of the top surface, a portion of the first side surface, and a portion of the second side surface of the resin molding.
Thus, the solid electrolytic capacitor of Example 1 shown in FIG. 1, FIG. 2, and FIG. 3 was produced.

Example 2

A solid electrolytic capacitor of Example 2 was produced similarly to the solid electrolytic capacitor of Example 1, except that between the forming an anode component and the forming a capacitor element component, the removing the porous portion and the forming an insulating layer were sequentially performed as described below.
Removing Porous Portion
The anode component formed in the forming an anode component was subjected to laser half-cutting to completely remove the porous portion on the trunk portion on the side adjacent to the elongated portions and in a region including a boundary between the trunk portion and the elongated portions. Thus, as shown in FIG. 13, a first region without the porous portion was formed in the trunk portion.

Forming Insulating Layer

In the first region formed in the removing the porous portion, an insulating resin was transfer printed by roller transfer, whereby insulating layers were formed on both the first anode main surface and the second anode main surface of the trunk portion as shown in FIG. 16.

Thus, the solid electrolytic capacitor of Example 2 having a structure shown in FIG. 14 and FIG. 15 was produced.

Comparative Example 1

Figure 19:
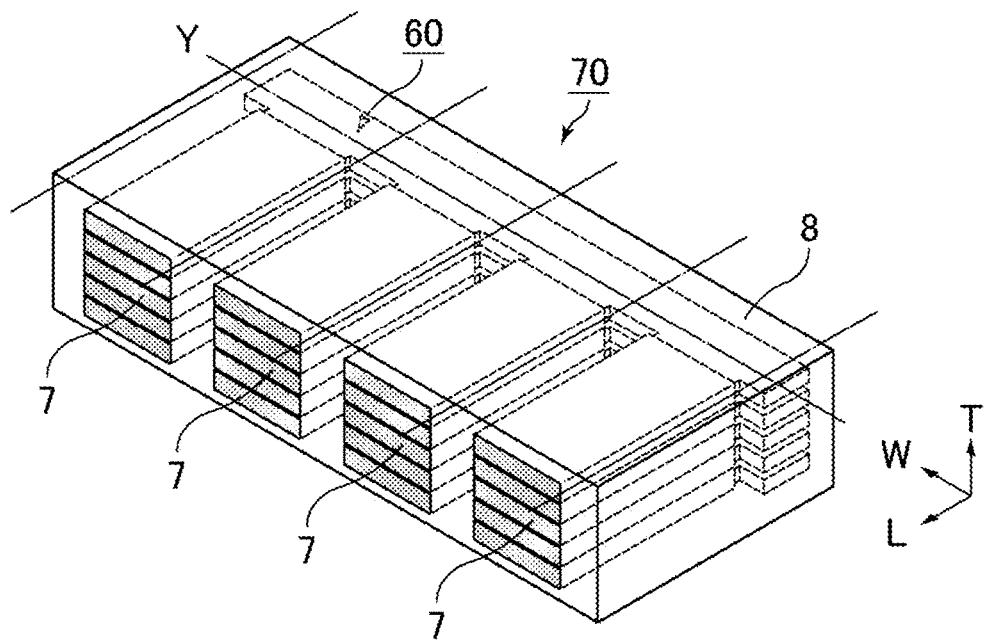
FIG. 19 is a schematic perspective view showing forming capacitor elements in a method of producing a solid electrolytic capacitor of Comparative Example 1.

FIG. 19 is a schematic perspective view showing forming capacitor elements in a method of producing a solid electrolytic capacitor of Comparative Example 1. The solid electrolytic capacitor of Comparative Example 1 was produced similarly to the solid electrolytic capacitor of Example 1, except that when singulating the sealed body into multiple resin moldings in the forming capacitor elements, the capacitor element component 60 was cut along a cutting line Y corresponding to a boundary between the trunk portion 51 and the elongated portions 52 as shown in FIG. 19 so that no trunk portion 51 was left. In other words, in the solid electrolytic capacitor of Comparative Example 1, the first outer edge and the second outer edge of the anode had the same length in the width direction.

Comparative Example 2

Figure 20:
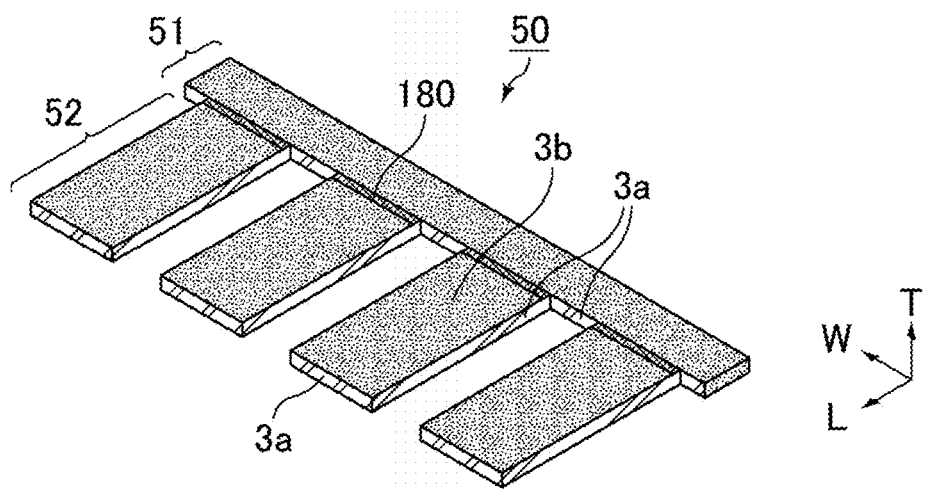
FIG. 20 is a schematic perspective view showing a porous portion filled with an insulating resin after forming an anode component in a method of producing a solid electrolytic capacitor of Comparative Example 2.

FIG. 20 is a schematic perspective view showing a porous portion filled with an insulating resin after forming an anode component in a method of producing a solid electrolytic capacitor of Comparative Example 2. The solid electrolytic capacitor of Comparative Example 2 was produced similarly to the solid electrolytic capacitor of Comparative Example 1, except that an insulating layer 180 was formed by filling the porous portion 3b with an insulating resin by roller transfer between the forming an anode component and the forming a capacitor element component. As shown in FIG. 20, the porous portion 3b is in a region of each elongated portion 52 on the side adjacent to the trunk portion 51 and includes a boundary between the elongated plates 52 and the trunk portion 51.

Comparative Example 3

Figure 21:
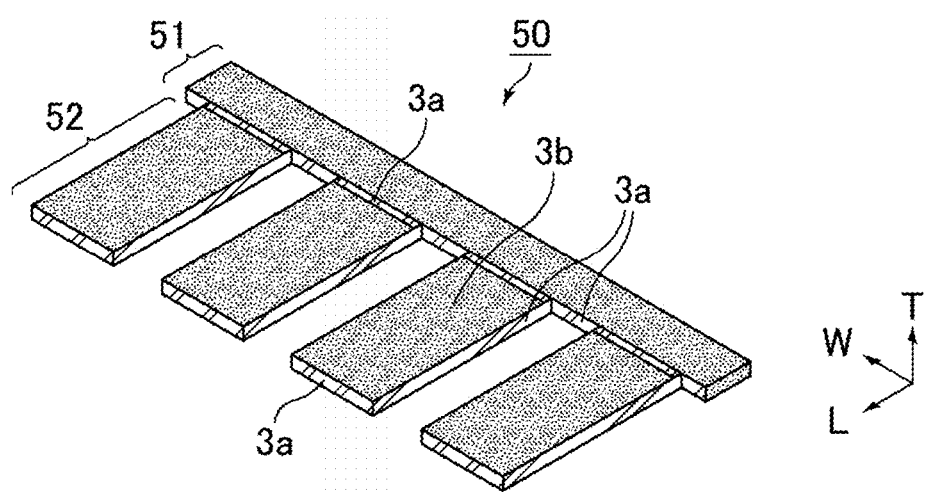
FIG. 21 is a schematic perspective view showing a porous portion with a portion removed after forming an anode component in a method of producing a solid electrolytic capacitor of Comparative Example 3.

FIG. 21 is a schematic perspective view showing a porous portion with a portion removed after forming an anode component in a method of producing a solid electrolytic capacitor of Comparative Example 3. A solid electrolytic capacitor of Comparative Example 3 was produced similarly to the solid electrolytic capacitor of Comparative Example 1, except that between the forming an anode component and the forming a capacitor element component, laser half-cutting was performed to completely remove the porous portion 3b in a region of each elongated portion 52 on the side adjacent to the trunk portion 51 and including a boundary between the elongated plates 52 and the trunk portion 51 as shown in FIG. 21.

Evaluation

The solid electrolytic capacitors of Example 1, Example 2, Comparative Example 1, Comparative Example 2, and Comparative Example 3 were evaluated as follows. Table 1 shows the results.

High Temperature Test

The solid electrolytic capacitor of each example was left to stand at a temperature of 105° C. for 1000 hours for a high temperature test. Changes in equivalent series resistance (ESR) induced by the high temperature test were determined as a ratio of "ESR after high temperature test"/"ESR before high temperature test".

High Humidity Test

The solid electrolytic capacitor of each example was left to stand at a temperature of 60° C. and a humidity of 93% for 1000 hours for a high humidity test. Changes in ESR induced by the high humidity test were determined as a ratio of "ESR after high humidity test"/"ESR before high humidity test".

TABLE 1

|  | Changes in ESR induced by high temperature test | Changes in ESR induced by high humidity test |
| --- | --- | --- |
| Example 1 | 1.2 | 1.2 |
| Example 2 | 1.2 | 1.1 |
| Comparative Example 1 | 1.7 | 1.5 |
| Comparative Example 2 | 1.5 | 1.3 |
| Comparative Example 3 | 2.0 | 1.5 |

As shown in Table 1, in each of the solid electrolytic capacitors of Example 1 and Example 2, the changes in ESR induced by the high temperature test and the high humidity test were small, as compared to the solid electrolytic capacitors of Comparative Example 1, Comparative Example 2, and Comparative Example 3. In other words, each of the solid electrolytic capacitors of Example 1 and Example 2 was found to have high reliability, with high adhesion between the anode and the first external electrode in both the high temperature environment and the high humidity environment.

REFERENCE SIGNS LIST 1a, 1b, 1c, 1d, 1e, 1f electrolytic capacitor
3 anode
3a valve-action metal substrate
3b porous portion
3p first outer edge
3q second outer edge
3s first anode main surface
3t second anode main surface
3u first anode end surface
5 dielectric layer
7 cathode
7a solid electrolyte layer
7b conductive layer
8 sealing resin
9 resin molding
9a first end surface of resin molding
9b second end surface of resin molding
9c bottom surface of resin molding
9d top surface of resin molding
9e first side surface of resin molding
9f second side surface of resin molding
11 first external electrode
13 second external electrode
20 capacitor element
30 stack
50 anode component
51 trunk portion
52 elongated portion
60 capacitor element component 70 sealed body
80, 180 insulating layer
AR1 first anode region
AR2 second anode region
BR1 first region
L length direction
T thickness direction
W width direction
Wp length in width direction of first outer edge
Wq length in width direction of second outer edge
X, Y cutting line

The invention claimed is:

1. An electrolytic capacitor comprising:
   a resin molding that includes:
      a capacitor element including an anode having a porous portion at a surface thereof, a dielectric layer on a surface of the porous portion, and a cathode opposite to the anode via the dielectric layer,
      a sealing resin sealing the capacitor element, and
      a first end surface and a second end surface opposite to each other in a length direction of the resin molding;
   a first external electrode on the first end surface of the resin molding; and
   a second external electrode on the second end surface and connected to the cathode exposed at the second end surface of the resin molding,
   wherein when viewed in a thickness direction perpendicular to the length direction of the resin molding, the anode includes a first anode region having a first outer edge exposed at the first end surface of the resin molding and connected to the first external electrode, and a second anode region having a second outer edge positioned closest to the second external electrode in the length direction, and
   a length of the first outer edge is greater than a length of the second outer edge in a width direction perpendicular to the length direction and the thickness direction of the resin molding.

2. The electrolytic capacitor according to claim 1, wherein the first anode region is in contact with the second anode region in the length direction.

3. The electrolytic capacitor according to claim 2, wherein a length in the width direction of the first anode region and a length in the width direction of the second anode region are respectively constant in the length direction.

4. The electrolytic capacitor according to claim 1, wherein a length in the width direction of the first anode region and a length in the width direction of the second anode region are respectively constant in the length direction.

5. The electrolytic capacitor according to claim 1,
   wherein the resin molding further includes a side surface intersecting the first end surface,
   the first external electrode extends from the first end surface of the resin molding to a portion of the side surface, and
   the anode is connected to the first external electrode at the side surface of the resin molding in the first anode region.

6. The electrolytic capacitor according to claim 5, further comprising an insulating layer on a surface of the anode in the first region.

7. The electrolytic capacitor according to claim 6,
   wherein the anode includes a first anode main surface and a second anode main surface opposite to each other in the thickness direction in the first anode region, and
   the insulating layer is on one or both of the first anode main surface and the second anode main surface of the anode in the first region.

8. The electrolytic capacitor according to claim 7,
   wherein the anode further includes a first anode end surface intersecting the first anode main surface and the second anode main surface and positioned closer to the second external electrode in the first anode region, and
   the insulating layer is also on the first anode end surface of the anode in the first anode region.

9. The electrolytic capacitor according to claim 1, wherein the porous portion is thinner at a position including at least a portion of the first outer edge in the first anode region than that of the porous portion in the second anode region.

10. A method of producing an electrolytic capacitor, the method comprising:
    forming an anode component including an anode having a porous portion at a surface thereof, and having a shape including a trunk portion extending in a width direction and an elongated portion protruding from the trunk portion in a length direction perpendicular to the width direction thereof;
    forming a capacitor element component by sequentially forming a dielectric layer on a surface of the porous portion and forming a cathode on a surface of the porous portion of the anode component;
    forming a capacitor element by cutting the capacitor element component along a cutting line in the width direction so that each of the resulting capacitor elements when viewed in a thickness direction perpendicular to the width direction and the length direction includes the anode, the dielectric layer, and the cathode, the anode including a first anode region including a first outer edge corresponding to the cutting line and a second anode region including a second outer edge positioned furthest away from the first anode region in the length direction within an outer edge of the elongated portion, and in which a length of the first outer edge of the anode is greater than a length of the second outer edge of the anode in the width direction;
    sealing the capacitor element component with a sealing resin so as to form a resin molding having a first end surface and a second end surface opposite to each other in the length direction, the first end surface having the first outer edge of the anode exposed therefrom, the second end surface having the cathode exposed therefrom;
    forming a first external electrode on the first end surface of the resin molding and connected to the first outer edge of the anode exposed at the first end surface of the resin molding; and
    forming a second external electrode on the second end surface of the resin molding and connected to the cathode exposed at the second end surface of the resin molding.

11. The method of producing an electrolytic capacitor according to claim 10,
    wherein the first anode region is a region including the trunk portion that remains after cutting, and
    the second anode region is a region including the elongated portion.

12. The method of producing an electrolytic capacitor according to claim 11, wherein a length in the width direction of the first anode region and a length in the width direction of the second anode region are respectively constant in the length direction.

13. The method of producing an electrolytic capacitor according to claim 10, wherein a length in the width direction of the first anode region and a length in the width direction of the second anode region are respectively constant in the length direction.

14. The method of producing an electrolytic capacitor according to claim 10, wherein the forming of the resin molding is carried out between the forming of the capacitor element component and the forming of the capacitor element.

15. The method of producing an electrolytic capacitor according to claim 10, wherein the forming of the resin molding is carried out after the forming of the capacitor element.

16. The method of producing an electrolytic capacitor according to claim 10, further comprising, between the forming of the anode component and the forming of the capacitor element component, removing at least a portion of the porous portion in the trunk portion so as to form a first region where the porous portion is thinner than that of the porous portion in the elongated portion.

17. The method of producing an electrolytic capacitor according to claim 16, further comprising, between the removing of the porous portion and the forming of the capacitor element component, forming an insulating layer on a surface of the trunk portion in the first region.

18. The method of producing an electrolytic capacitor according to claim 17, wherein the insulating layer is formed on one or both of a first anode main surface and a second anode main surface opposite to the first anode main surface in the thickness direction of the trunk portion in the first region.

19. The method of producing an electrolytic capacitor according to claim 18, wherein the insulating layer is formed on a first anode end surface intersecting the first anode main surface and the second anode main surface and positioned closer to the elongated portion in the trunk portion.

* * * * *